Aug. 11, 1931.  E. H. RYDEN  1,818,433
REFRIGERATION
Filed Dec. 6, 1927    2 Sheets-Sheet 1

INVENTOR
Eric Herbert Ryden
BY
his ATTORNEY

Patented Aug. 11, 1931

1,818,433

UNITED STATES PATENT OFFICE

ERIC HERBERT RYDEN, OF NEW YORK, N. Y., ASSIGNOR TO ELECTROLUX SERVEL CORPORATION, OF NEW YORK, N. Y., A CORPORATION OF DELAWARE

REFRIGERATION

Application filed December 6, 1927. Serial No. 238,220.

My invention relates to the art of refrigeration and particularly to refrigerating apparatus of the absorption type which operate continuously and at a constant pressure throughout.

My invention aims to produce an improved generation and analyzing of vapor in an absorption refrigerating system, the nature of which will be apparent from the following description, reference being had to the accompanying drawings, of which:

Figure 1:
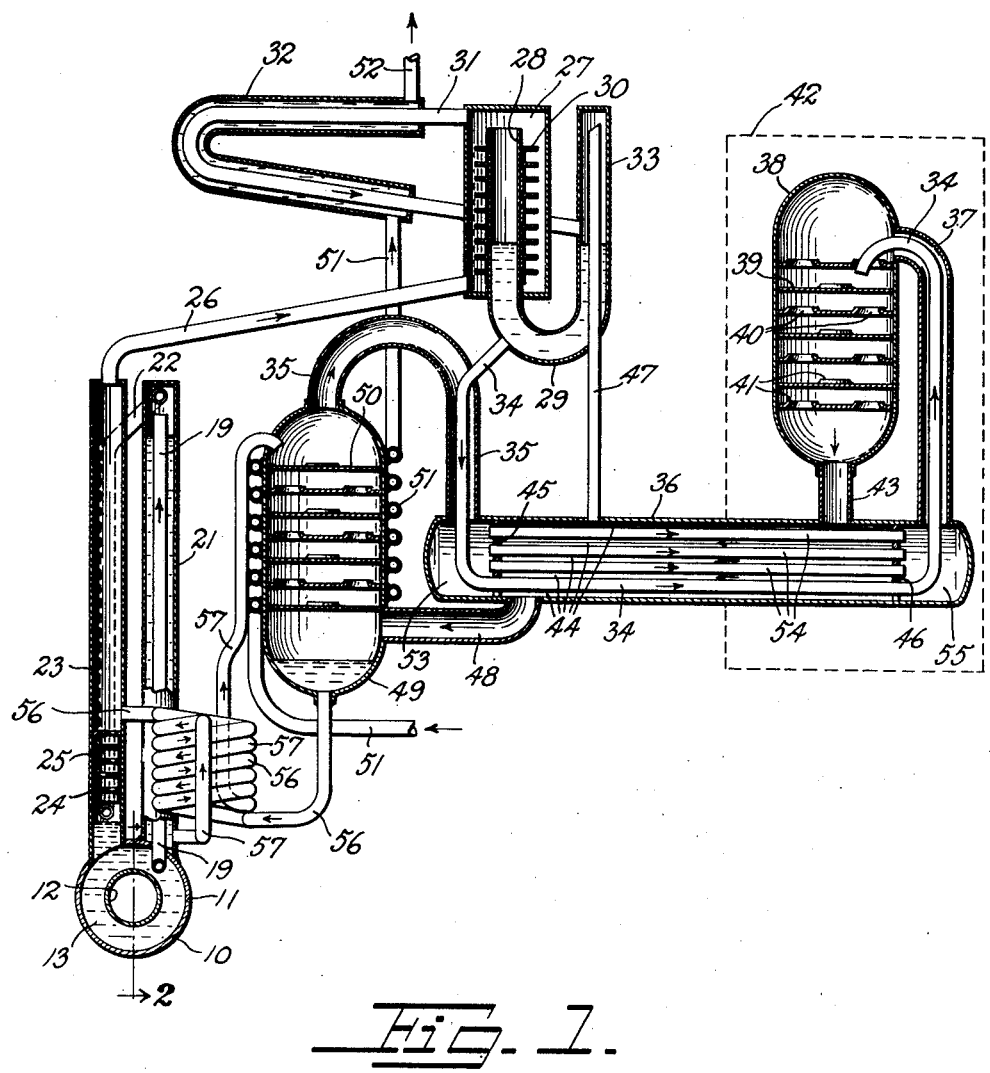
Fig. 1 is an elevational view, partially in cross-section of a preferred embodiment of my invention, and is taken partly on the line 1—1 and partly on the line 1a—1a of Fig. 2.
Figure 2:
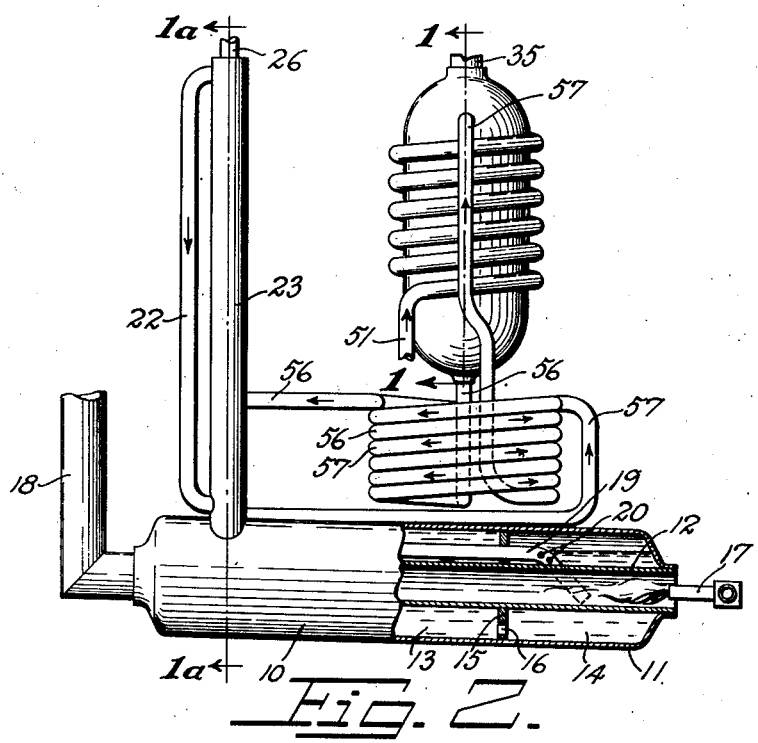
Fig. 2 is an elevational view, partially in cross-section, of a portion of the apparatus shown in Fig. 1, the cross section being taken on the line 2—2 of Fig. 1.

Referring more particularly to Figs. 1 and 2, reference character 10 designates generally a generator. Generator 10 comprises an outer shell 11 placed in a more or less horizontal position and through which extends a central flue 12. The closed annular space between shell 11 and flue 12 is divided by means of a partition 15 into what may be appropriately termed a vapor separation chamber 13 and a thermo-siphon chamber 14. It is to be understood, however, that vapor is also separated in the thermo-siphon chamber 14 as well as in the vapor separation chamber 13. The two chambers 13 and 14 are in communication with each other by means of a passageway 16 formed through the lower part of partition 15. Any suitable source of heat, such as, for instance, a gas burner 17, is arranged to heat generator 10, more intensely in the neighborhood of thermo-siphon chamber 14 than vapor separation chamber 13. In case a gas flame is used, a conduit 18 is attached to the opposite end of flue 12 from the burner to carry off the products of combustion.

The lower end of a riser conduit 19 terminates in the lower part of chamber 14 and is provided with one or more holes 20. Conduit 19 extends through partition 15, within chamber 13, and thence upwardly through shell 11 into a standpipe or receiver 21 and terminates within the standpipe near the top. Standpipe 21 is preferably securely attached to generator 10, as by welding, but is not in communication therewith except through conduit 19 and other conduits. A conduit 22 connects the upper part of standpipe 21 with the lower part of an analyzer 23. Analyzer 23 comprises an upright cylindrical member, the lower end of which is in open communication with the interior of vapor separation chamber 13. Within the analyzer and above the point where conduit 22 communicates therewith is a series of disks 24 in which are formed apertures 25. Apertures in adjacent disks are in staggered relation to each other.

A conduit 26 communicates with the upper part of analyzer 23 and extends upwardly to communicate with the lower part of a rectification chamber 27. One leg 28 of a U-shaped member 29 extends within chamber 27 and is in open communication therewith near the top. Leg 28 within chamber 27 is provided with a series of annular flanges 30. A condensing conduit 31 communicates with the top of rectification chamber 27 and extends in a generally downward direction within a water jacket 32 and communicates with the other leg 33 of U-shaped member 29.

A conduit 34 communicates with the lower part of U-shaped member 29, extends downwardly within a conduit 35, horizontally within a gas heat exchanger 36, and upwardly within a conduit 37 to within an evaporator 38 where it terminates in a goose-neck bend. Evaporator 38 comprises a cylindrical member closed at the top and within which is posited a series of disks 39. Disks 39 are formed with apertures 40 therethrough surrounded by raised rims 41. Conduit 34 extends downwardly through one of the apertures in the uppermost disk. Evaporator 38 and a portion of the heat exchanger 36 are placed within the space to be cooled, represented by the dotted rectangle 42.

A conduit 43 connects the lower part of evaporator 38 with a space 44 formed within heat exchanger 36 between heads 45 and 46. A conduit 47 establishes communication between the upper part of leg 33 of U-shaped member 29 and space 44. A conduit 48 connects the lower part of space 44 with the lower part of an absorber 49. Absorber 49 comprises a closed cylindrical member in which is posited a series of disks 50 which may be similar to disks 39 in evaporator 38. A cooling water conduit 51 is coiled around absorber 51 in heat exchange relation therewith, as by welding. The outlet of conduit 51 communicates with water jacket 32 from which a conduit 52 leads to a discharge.

Conduit 35 communicates with the upper part of absorber 49 and with a space 53 formed in heat exchanger 36 between head 45 and the adjacent end of the heat exchanger. A plurality of tubes 54 connect space 53 with a similar space 55 formed in the other end of the heat exchanger. Conduit 37 connects space 55 with the upper part of evaporator 38.

A conduit 56 communicates with the bottom of absorber 47, extends in heat exchange relation with another conduit 57 and communicates with analyzer 23 above disks 24 therein. Conduit 57 communicates with the lower part of standpipe 21, extends in heat exchange relation with conduit 56 and with cooling water conduit 51 and communicates with the upper part of absorber 49. Conduits 56 and 57 are conveniently placed in heat exchange relation by placing them together in the form of a coil and welding adjacent turns together. Conduit 57 is preferably welded to successive turns of conduit 51 in order to obtain a good heat transfer.

Figure 3:
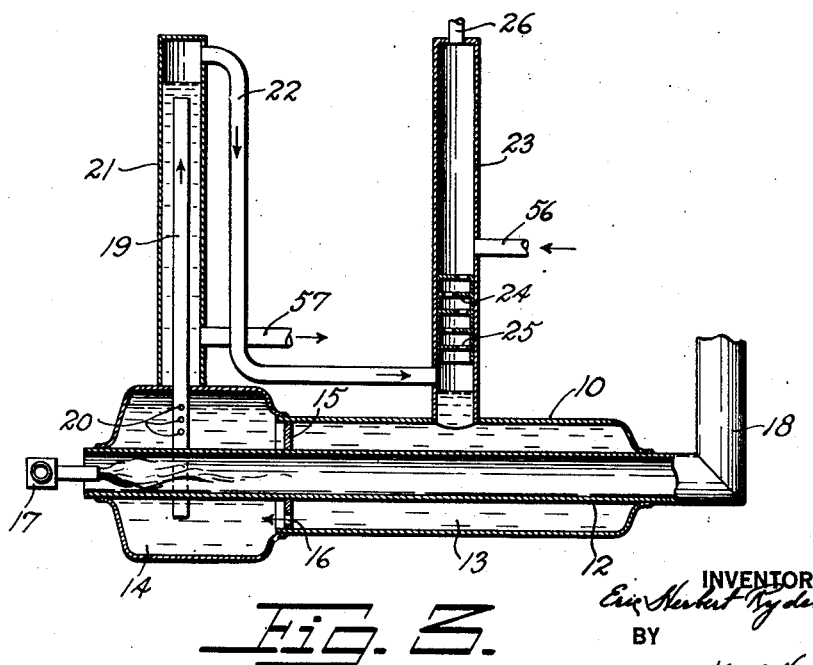
Fig. 3 is an elevational view, partially in cross-section, of a modification of the generator shown in Figs. 1 and 2.

The generator and attendant parts shown in Fig. 3 are similar in principle to those of Figs. 1 and 2, but the arrangement is somewhat modified. Like reference characters indicate corresponding parts in the two embodiments.

Generator 10 in Fig. 3 comprises a vapor separation chamber 13 and a thermo-siphon chamber 14 separated by partition 15 in which is formed passageway 16. Flue 12 extends centrally throughout the generator. A suitable source of heat, such as gas burner 17, is located in the end of flue 12 adjacent to chamber 14 and the other end of the flue communicates with a conduit 18. Chamber 13 is longer but of somewhat less diameter than chamber 14.

A riser conduit 19 extends from within the lower part of chamber 14 through the top thereof and upwardly within standpipe 21. As in the case in Figs. 1 and 2, standpipe 21 is preferably welded to generator 10 but is not in direct communication therewith except through conduits 19 and 22. One or more holes 20 are formed in thermo-siphon conduit 19 as shown. Conduit 22 connects the upper part of standpipe 21 with the lower part of analyzer 23. Analyzer 23 is in direct communication with vapor separation chamber 13. A series of disks 24 with apertures 25 are posited within analyzer 23 above the point where conduit 22 communicates therewith. Conduit 26 connects the upper part of analyzer 23 with a rectification chamber, not shown but similar to chamber 27 in Fig. 1. A conduit 56 communicates with analyzer 23 above disks 24 and with the bottom of an absorber. Conduit 57 connects the lower part of standpipe 21 with the upper part of an absorber.

The operation of the apparatus according to my invention is as follows:

A solution of a refrigerant, such as ammonia, dissolved in an absorbing medium, for instance water, flows by gravity from absorber 49 through conduit 56 into analyzer 23. This solution is preheated somewhat before it enters the analyzer by being brought in heat exchange relation with hot liquid in conduit 57, as will be explained later, but it is still well below the temperature of the liquid in generator 10.

The strong solution upon entering analyzer 23 passes downwardly through apertures 25 in disks 24 to vapor separation chamber 13. In chamber 13 the application of heat from burner 17 serves to drive the ammonia out of solution at a comparatively low temperature and the vaporous ammonia and some water vapor pass upwardly through analyzer 23 where they are cooled somewhat by the cooler liquid passing downwardly therethrough. This cooling effects the condensation of a part of the water vapor and consequently the ammonia vapor after leaving the analyzer is both dryer and cooler than it otherwise would be if no analyzer were employed.

The solution, after having been heated somewhat in vapor separation chamber 13, passes through passageway 16 into thermo-siphon chamber 14 where it is further heated and more vapor is driven off. This vapor collects in the upper part of chamber 14 until it has depressed the liquid level therein below uppermost hole 20 where a small portion of it passes into conduit 19 and carries a slug of liquid upwardly therethrough into standpipe 21. The liquid passes downwardly through the standpipe while the vapor passes through conduit 22 to the lower part of the analyzer where it joins the vapor coming directly from vapor separation chamber 13.

The ammonia vapor with a small amount of water vapor passes from the upper part of analyzer 23 through conduit 26 to rectification chamber 27, where its temperature is reduced by liquid ammonia within leg 28 of U-shaped member 29. This reduction in temperature is sufficient to liquefy the water vapor which flows back through conduit 26 but the ammonia remains uncondensed and passes from the upper part of chamber 27 into condensing conduit 31. Here the ammonia is liquefied by the cooling action of cooling water in water jacket 32. The liquid ammonia thus formed passes from conduit 31 into leg 33 of member 29. Any non-condensable gas or gases that leave the generator tend to collect in leg 33 and form a gas pocket. In order to prevent this, a conduit 47 is provided which allows any such gas to pass to heat exchanger 36.

Liquid ammonia passes from member 29 through conduit 34 to within the upper part of evaporator 38. Within the evaporator the ammonia comes in intimate contact with a gas inert with respect to ammonia, for instance hydrogen, which is admitted through conduit 37. The ammonia evaporates in the presence of and diffuses into the hydrogen and the accompanying drop in temperature produces refrigeration. As the vaporous mixture of ammonia and hydrogen thus formed is heavier than the relatively pure hydrogen which enters near the top of the evaporator, the mixture passes downwardly therethrough and through conduit 43 to space 44 in heat exchanger 36. From space 44 the mixture passes through conduit 48 into the lower part of absorber 49 where it comes in intimate contact with water which has but a relatively small amount of ammonia in solution and which enters the absorber near the top through conduit 57.

The water absorbs the ammonia from the ammonia-hydrogen mixture while the lighter hydrogen is not absorbed and passes upwardly through the absorber and through conduit 35 to space 53 in heat exchanger 36. The heat which results from the absorption process is carried away by the cooling water in conduit 51. From space 53 the hydrogen passes through tubes 54 to space 55 and thence through conduit 37 to evaporator 38. In heat exchanger 36 the hydrogen gas in tubes 54 and the liquid ammonia in conduit 34 are precooled before entering the evaporator by the vaporous ammonia-hydrogen in space 44 which has just left the evaporator.

The cool strong solution of ammonia in water formed in absorber 49 flows therefrom by gravity through conduit 56 to analyzer 23. The hot weak solution which contains but a relatively small amount of ammonia passes from the bottom of standpipe 21 through conduit 57 to the upper part of the absorber. As conduits 56 and 57 are in heat exchange relation, the hot solution is cooled before entering the absorber while the cool solution is heated before entering the generator. The solution in conduit 57 is further cooled by the cooling water in conduit 51.

Inasmuch as the operation of the apparatus shown in Fig. 3 is similar in all respects to that of the apparatus shown in Figs. 1 and 2, it is not necessary to repeat the description.

While I have shown and described specific embodiments of my invention, it is to be understood that structural variations fall within its scope. Also the agents employed in the apparatus may be varied without departing from the spirit of my invention.

Having thus described my invention, what I claim is:

1. Refrigerating apparatus comprising a generator having a plurality of heated chambers, a receiver, an analyzer, an absorber, means to raise liquid from one of said chambers to said receiver, another of said chambers being connected to said analyzer to supply vapor thereto, means to introduce absorption liquid into said analyzer, a condenser for liquefying vapor expelled in the generator, a connection between said analyzer and said condenser, the parts being so connected that all vapor passing to the condenser from the chambers and the receiver is forced to pass through the analyzer in counter flow to and in direct contact with absorption liquid passing therethrough, and means for conveying liquid by gravity from said receiver to the upper part of said absorber.

2. Refrigerating apparatus comprising a generator shell, means for dividing said shell into a plurality of chambers, means to heat the plurality of chambers, a standpipe, a vertically disposed analyzer comprising a series of discs, an absorber, means to introduce absorption liquid into the upper part of the analyzer, a riser conduit for lifting absorption liquid from one of said chambers to said standpipe, said analyzer being connected to another of said chambers to receive vapor therefrom, a conduit for conducting vapor from the upper part of said standpipe to the lower part of said analyzer, said analyzer affording intimate contact therein between liquid and vapor passing therethrough and means for conducting absorption liquid by gravity flow from said standpipe to the upper part of said absorber.

3. Refrigerating apparatus comprising a generator shell, means for dividing said shell into a plurality of communicating chambers, means to heat the plurality of chambers, a standpipe, a vertical analyzer comprising a series of discs, an absorber, means for conducting absorption liquid from said absorber to the upper part of the analyzer, a riser conduit for lifting absorption liquid from one of said chambers to said standpipe, said analyzer being connected to receive vapor from another of said chambers, a conduit for conducting vapor from the upper part of said standpipe to the lower part of said analyzer and means for conducting absorption liquid from said standpipe to said absorber.

4. Refrigerating apparatus comprising a generator having a plurality of heated chambers, an absorber, a receiver situated to permit liquid to flow therefrom into the absorber by gravity, a narrow conduit adapted to receive absorption liquid and vapor from one chamber of the generator and deliver the same to the receiver, a relatively large conduit connected to the generator for conducting vapor therefrom, analyzing means in the last mentioned conduit, means to conduct absorption liquid from said absorber to said analyzing means, means to conduct vapor from said receiver to said analyzing means, and means to conduct absorption liquid from said receiver to said absorber.

5. In a refrigerating apparatus, an analyzer, a generator, said analyzer being connected to receive vapor from said generator, an absorber, means to form a thermo-siphon circulation between the generator and absorber and means for conducting vapor produced in forming the thermo-siphon circulation through the analyzer.

In testimony whereof I hereunto affix my signature.

ERIC HERBERT RYDEN.